Patented May 25, 1954

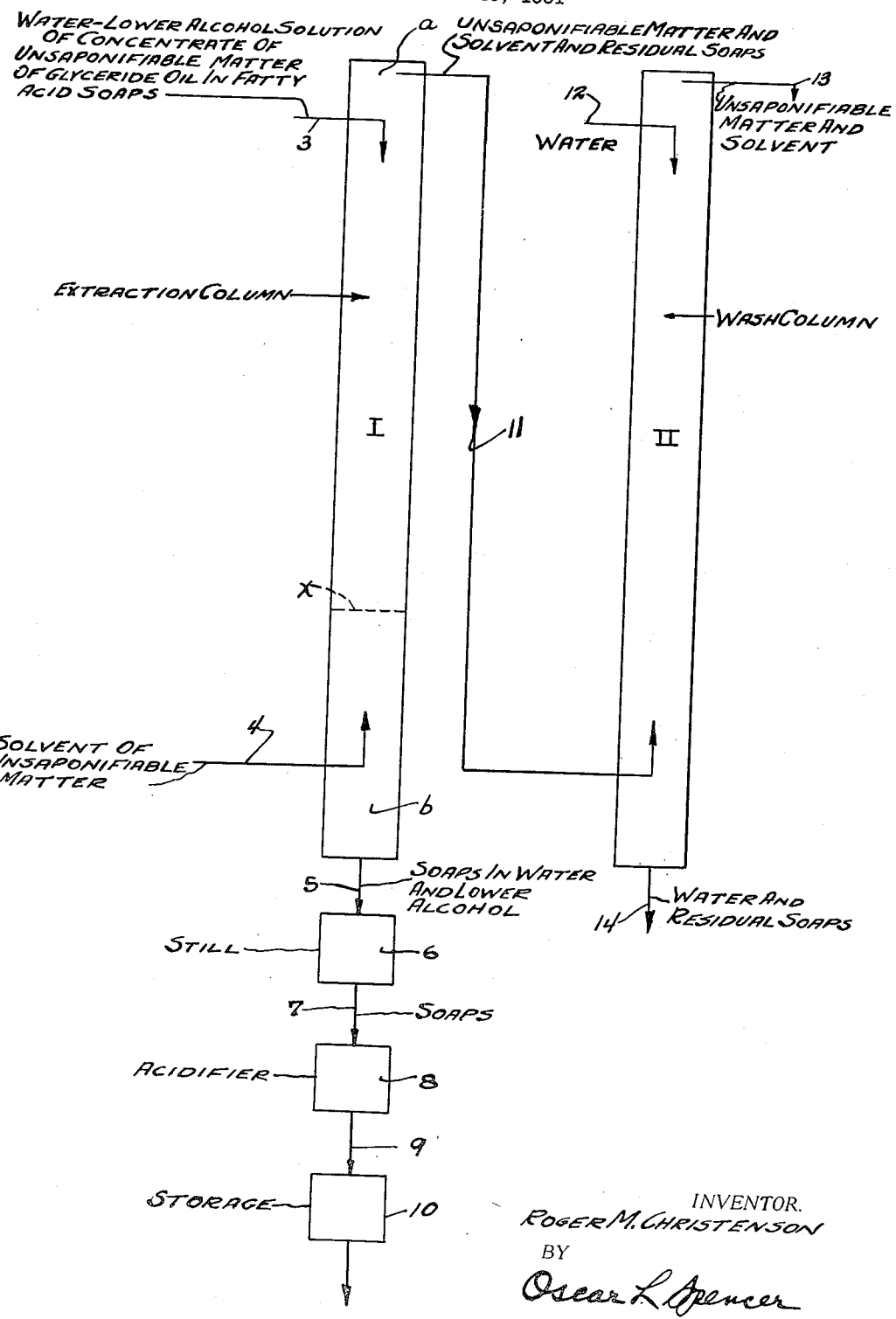

2,679,503

UNITED STATES PATENT OFFICE 2,679,503

EXTRACTION OF STEROLS AND ANTIOXIDANTS

Roger M. Christenson, Whitefish Bay, Wis., assignor to Pittsburgh Plate Glass Company Application November 13, 1951, Serial No. 256,110

20 Claims. (Cl. 260—397.25)

The present invention relates to methods of obtaining sterols and antioxidants suitable for various applications such as intermediates in the preparation of wetting agents, pharmaceuticals, preservatives of food products and other products subject to deterioration by reason of oxidation. The invention has particular relation to the recovery of sterols, antioxidants and other unsaponifiable components from concentrates derived from a glyceride oil such as soybean oil or related products.

The tocopherols which are anti-oxidants are also called vitamin E. The materials are of interest for nutritional and medicinal uses and a large scale convenient method for their isolation would be of great value.

It has heretofore been recognized that some of the glyceride oils, notably soybean oil, contain, in addition to a complex mixture of fatty acid triglycerides and free fatty acids, small amounts of unsaponifiable compounds such as sterols, tocopherols and other constituents. Many of these unsaponifiable constituents were, if recoverable, recognized to be of great value in the preparation of inhibitols or antioxidants for food products or emulsifiers and in some cases, in the preparation of pharmaceuticals such as sex hormones and the like. However, prior to the present invention no suitable process applicable on a large or commercial scale for their preparation has been available. For these reasons some of the materials, although much in demand have remained extremely expensive and the use thereof by the general public has been limited.

The present invention relates to a process whereby the sterols, antioxidants and other unsaponifiable constituents of the natural glyceride oils or related products are recoverable economically and in large quantities. According to the process a concentrate of fatty acids or glycerides and sterols produced according to various methods and containing in excess of 3% by weight of unsaponifiable matter is subjected to the steps of saponifying the fatty acids or the glycerides of fatty acids associated with the sterols and the antioxidants in soybean oil by means of a suitable alkali, making up the soaps into solution with water and a lower alcohol in such concentration that no emulsions are obtained when contacted with an extracting solvent, then extracting the unsaponifiable constituents in counter-current fashion from the soap solution by application of an appropriate solvent such as naphtha, an ether or a chlorinated hydrocarbon or any other solvent of the unsaponifiable matter, which is substantially insoluble or but slightly soluble in the mixture of water, alcohol and soap.

For a better understanding of the invention reference may now be had to the accompanying drawings in which the single figure diagrammatically illustrates a convenient process of effecting the various extractions involved in or applicable in the practice of the invention.

In the practice of this invention, various products comprising soybean oil glycerides or fatty acids or soaps of fatty acids or mixtures of these, and unsaponfiable materials in sufficient concentration may be employed as starting materials. These may be derived from several sources. For example, in certain processes of extracting oils such as those disclosed in Freeman Patents 2,200,390 and 2,200,391 glyceride oils, such as soybean oil, were subject to treatment with selective polar solvents such as furfural, ethyl aceto acetate or the like, having preferential solvent action to the more unsaturated components of the glyceride oils. The sterols and inhibitols of soybean oil are selectively dissolved by the polar solvent so that the extract fraction resulting from the application of the process is substantially enriched in these components.

It is usually practicable thus to extract 20 to 80 per cent of the original oil as a solution in a polar solvent such as anhydrous furfural. The solvent can be removed from this solution with the further concentration of the unsaponifiables and the mixture, then saponified with alkali and treated under the provisions of the present invention to recover unsaponifiables. However, in most instances, it is preferable first to selectively remove the major portion of the glyceride oil components from the solution for other uses, at the same time further concentrating the unsaponifiable matter with respect to the glyceride oil remaining in solution. Various methods of effecting such concentration are available.

One convenient method, however, involves selectively extracting the glycerides of the fatty acids from the polar solvent solution by means of a solvent immiscible with or only partially miscible with the polar solvent. Naphtha constitutes one such solvent. Preferably, naphtha of paraffinic character is employed and it may comprise hydrocarbons of various molecular weights containing, for example, 6 to 10 carbon atoms in the molecule. However, a heptane to decane fraction has been found to operate efficiently in the system. In most instances, it is advisable to strip off a portion of the polar solvent, such as furfural, from the extract solution by distillation before washing the solution with naphtha.

Sufficient solvent may be distilled to form a 20 to 50% solution by weight of oil in furfural. The remaining extract solution may then be washed with naphtha within a ratio of approximately .2 to 10 parts by volume per part of original oil extracted. The operation may be conducted countercurrently in a suitable column or may be conducted batchwise. Preferably, the temperature of operation is within an approximate range of 45 to 95° F. though variations of five or ten degrees higher or lower are contemplated.

As a result of the washing of the extract solution of oil dissolved in polar solvents, nearly all of the glyceride oils are extracted out into the naphtha solution. The naphtha from this solution may be evaporated and the oil recovered for use as a drying oil or for other purposes. There remains in the polar solvent a concentration of the free fatty acids and the unsaponifiable matter and some glyceride oils. This latter portion, hereinafter called "by-product," is small with respect to the original oil extracted but is, of course, considerable with respect to the small amount of unsaponifiable matter. The free fatty acids, unsaponifiables and glyceride oils may be recovered from the polar solvent solution by evaporation of the solvent. It is also permissible to extract them out with an excess of naphtha and then to evaporate the naphtha. The composition of the recovered portion is approximately as follows:

5 to 40 percent by weight free fatty acid
4 to 30 percent by weight unsaponifiable matter
The remainder—glyceride oils and other constituents If preferred, a concentrate of the unsaponifiable matter, free fatty acids and a small amount of glyceride oil may be recovered from an extract product oil by contacting this extract oil with a wet polar solvent, such as a saturated or nearly saturated solution of furfural and water. Conveniently, this extraction can be conducted at a temperature of about 60 to 90° F. Before the aqueous furfural extraction, all or much of the original polar solvent, such as furfural, employed in initially treating the original oil, may be eliminated by distillation.

As a result of the extraction of the original extract oil with wet polar solvents such as furfural, the free fatty acids, unsaponifiable matter and a small amount of glycerides are extracted in the wet solvent. The glycerides of the free fatty acids are relatively insoluble and separate out as a layer which can be recovered for other purposes. The remaining concentrate or "by-product" of unsaponifiable matter, free fatty acids and residual glyceride oils or glycerides of free fatty acids may be recovered by evaporation of the solvents and are of much the same composition as that recovered by the extraction of the polar solvent extract with naphtha.

Another appropriate source material of unsaponifiable matter suitable for use in the practice of the present invention comprises the so-called soap stocks and "foots" acids resulting from the refining of soya oil with small amounts of alkali. In this refining operation, small amounts of free fatty acids and glycerides of soya oil are converted into soaps, and when these are separated off, it has been found that a high percentage of the unsaponifiable matter and notably of the sterols, of which stigmasterol is one of the most important, are retained in the soap stock fraction. Soap stocks also include considerable amounts of unsaponified glycerides as well as substantial amounts of water. A typical composition of a soya soap stock is given on page 834 in the book "Soybeans and Soybean Products," volume II, by Klare S. Markley. When recovered, the free fatty acids liberated are of considerable value.

In accordance with this invention, these foots can be treated with alkali, such as sodium hydroxide, or other sources of mixtures of soybean acids or soybean glycerides rich in unsaponifiable matter such as sterols and tocopherols are available and may be used as starting materials in the practice of the present invention. Some such additional sources include:

1. Distillation residue from distillation of soya acids.
2. Extraction of oil bearing soya meal with hot ethanol or a mixture of methanol and hexane. When the solution cools a concentrate of unsaponifiable matter exists in the alcohol layer.
3. The distillate from the molecular distillation of soybean oil.
4. In the treatment of soya oil with adsorbants such as fuller's earth or activated clay, unsaponifiable matter is selectively adsorbed and the resultant concentrate of unsaponifiable matter can be extracted out from the adsorbant, after the latter has been filtered off, by treating the adsorbant with naphtha or other solvents. When the naphtha is evaporated, the concentrate is recovered.
5. A concentrate of unsaponifiable matter is obtained by liquid extraction of soya oil with a lower aliphatic alcohol of one to three carbon atoms such as methanol, ethanol, propanol or isopropanol.
6. Concentrates of unsaponifiable matter distill off when the soya oil is vacuum deodorized by blowing with steam.
7. Fatty acids from saponification and subsequent acidification of soya oil or by hydrolysis of soya oil, or soya soap stocks may be extracted, for example, with furfural and naphtha, as disclosed in my application Serial No. 160,919, filed May 9, 1950, now Patent 2,573,891, to provide a concentrate very rich in unsaponifiable matter.
8. A concentrate of unsaponifiable matter prepared by the extraction of soya oil with liquid propane.

All of these materials containing about 3% and upward of unsaponifiables can be employed as starting materials in the practice of this invention. The concentrates can be saponified with alkali, made up into an appropriate solution in water and a lower water soluble, monohydric alcohol and then they can be countercurrently extracted with naphtha or other solvent of unsaponifiable matter which is at least partially immiscible in the soap solution.

Likewise, it is possible to obtain even further preliminary concentration of the unsaponifiable matter and thus to reduce the volume of soap solution extracted by splitting the glycerides in a concentrate of unsaponifiable matter such as a soap stock or a by-product from solvent extraction of soya oil, and then fractionally distilling off free fatty acids. Such splitting may be effected by saponifying the concentrate with alkali and then acidifying the resultant soaps. The acids can also be liberated by hydrolization or by Twitchellization or similar methods. A large amount of the fatty acids can then be distilled. As a result of this operation, the unsaponifiable matter, and notably the sterols, are even further concentrated in the still residue. This residue may then be subjected to treatment with alkali in order to resaponify the free fatty acids and glycerides remaining, and the mixture of soaps and unsaponifiable matter may be made up into solution and extracted in the manner above described.

Summarizing, the compositions to be treated according to the invention have the following composition: (upon a water free basis)

3–50% by weight unsaponifiable matter
5–70% by weight of free fatty acids or soaps
The remainder—glyceride oils and other constituents These compounds are saponified and the saponified mixture comprises in addition to water and alkali, the following:

5–35% of soybean oil concentrate (in a saponified form)
10–40% of methanol, ethanol, isopropanol, or propanol
30–85% water
0.5–7.0% of alkali (as soaps or free)

Extraction of an alcohol solution of such a saponified mixture with naphtha or like solvent may be effected in an apparatus such as an extraction column of the type disclosed in the present drawings. It may also be effected by continuously feeding naphtha and soap solution into a centrifuge of the so-called Podbieniak type. The solution in the latter is fed in at the axis and naphtha in at the outer periphery. The denser component (soap solution) permeates outwardly along an involutely coiled perforated diaphragm in the centrifuge and the naphtha permeates inwardly in continuous countercurrent flow. The naphtha phase is drawn off at the axis of the centrifuge and the soap solution is drawn off at the periphery. This type of apparatus is covered in patents such as: 2,209,577, 2,281,796, 2,109,375, 1,936,523, 2,286,157.

A suitable embodiment of apparatus for use in the practice of the invention is illustrated in the drawings and comprises columns I and II. A soap solution of unsaponifiable concentrate may be fed into column I near the top thereof as indicated at 3 and a naphtha solution is fed in near the bottom as indicated at 4. Soap solution from which the extract of unsaponifiable matter has been removed is drawn off from the bottom of the column as indicated at 5 and passes to a still 6 for removal of the solvents contained therein. The soaps may then pass through a line 7 to a container 8 where the soaps are acidified in order to regenerate the free fatty acids. Such acids are drawn off as indicated at 9 and passed to a container 10 for storage or for further treatment.

The solution of unsaponifiable matter in naphtha is drawn off at the top of column I as indicated at 11 and passes to a zone slightly above the bottom of column II. Simultaneously, water is fed into the top of column II as indicated at 12 in order to wash out residual soaps from the concentrate of unsaponifiable mater. The naphtha solution of concentrate is drawn off as indicated at 13 at the top of column II. Simultaneously, the water solution of soaps and other water soluble constituents is drawn off as indicated at 14, and may be subjected to further treatment. The naphtha solution of unsaponifiable matter passing out at 13 may be subjected to further treatment, for example to evaporation in order to eliminate the naphtha contained therein.

The proportioning of the several components in the centrifuge or in the column I will vary to some degree for different alcohols as solvents. However, the ranges are fairly nearly coextensive and overlap each other over much of their extent. With alkyl monohydric alcohols containing 1 to 3 carbon atoms, e. g. methyl, ethyl isopropyl and propyl alcohol, the proportions usually will fall approximately within the ranges specified in the examples which are to follow. In most instances, the proportions in the solutions comprising water and an alcohol of 1 to 3 carbon atoms may vary. A good average statement of proportions in the final feed solution for any of these alcohols will be approximately as follows:

Saponified sterol concentrate, 100 parts by weight upon a water free basis
Water, 146 to 1460 parts by weight
Alcohol of 1 to 3 carbon atoms, 61 to 610 parts by weight Naphtha preferably is employed in a ratio of 1 to 10 parts by volume per part of soap solution.

The temperature of operation of the system may be almost any from approximately normal room temperature or thereabouts up to that at which one or more components of the system tend strongly to volatilize off.

The temperature should not exceed the boiling point of any component of the system. A range of about 100 to 160 or 180° F. is preferred.

The flow of solvent of unsaponifiable matter, e. g naphtha, may be within a range of about 1 to 10 parts by volume per part of soap solution. The rate of feed to the column should be within a range at which an interface X will form between the water-alcohol phase and the naphtha phase at some level between the outlets for raffinate and the extract, and the phases will effectively separate from each other in the clearing zones A and B at the ends of the column.

If desired, the naphtha solution of unsaponifiable matter may be water-washed to remove traces of soaps. The naphtha may then be evaporated from the raffinate phase to recover the unsaponifiable matter.

The concentrates of free fatty acids and unsaponifiable matter in the small residue of glyceride oil is excellently adapted for treatment in accordance with the provisions of the present invention for purposes of recovering the sterols, tocopherols and other unsaponifiable constituents. In order to accomplish this result the free fatty acids and the glycerides are first converted into soaps soluble in water and alcohol.

The following examples illustrate the application of the principles of the invention in the recovery of unsaponifiable matter of soybean oil from a concentrate such as is herein described.

*Example I*

One thousand kilograms of a special soybean oil (by-product) derived by solvent fractionation in accordance with the provisions of the technique already described containing 4.6% unsaponifiable material (a large percentage of which was sterol in nature) and the remainder being glyceride oil, fatty acids, and other constituents was saponified in 1000 liters of methyl alcohol, and 375 liters of water with 200 kilograms of sodium hydroxide and was then diluted with 1000 liters of water. Four parts of this solution was diluted with a mixture of 2 parts of water and 1 part of methyl alcohol. The total water was 3061 liters or 3061 kilos. The total methyl alcohol was 1639 kilos or 2060 liters. It is contemplated that substantial variations in these values may at times be desired. Proportions of as low as 50% or as high as four or five-fold are contemplated. This variation may be tabulated as follows:

By-product oil as soaps, 100 parts by weight upon a water free basis
Water, 153.5 to 1535 parts by weight
Methyl alcohol, 81.9 to 819 parts by weight The resultant solution of saponified fatty acids and unsaponifiable matter in water and alcohol was then countercurrently extracted in an appropriate column with naphtha of about a heptane fraction. The solution is particularly well adapted to countercurrent extraction because it does not form emulsions, a difficulty characterizing many solutions. The naphtha was introduced at the bottom of the column and the soap solution at the top. The conditions of operation are tabulated as follows:

Column temperature, 148° F.
Soap solution feed, 65 parts by volume per minute
Naphtha feed, 120 parts by volume per minute From the original 1000 kilograms of extract were recovered 4.2 kilograms of unsaponifiable matter relatively rich in stigmasterol. Recovery of the unsaponifiable matter may be attained by evaporation of solvent or other appropriate method.

Example II

Two hundred pounds of extracted soybean oil by-product of the same character as that described in Example I but containing more unsaponifiable matter, was saponified with 50 pounds of sodium hydroxide in 25 pounds of water and 185 pounds of isopropyl alcohol under reflux. This solution was diluted with 530 pounds of water and extracted in the countercurrent column with a heptane fraction of naphtha. The total amount of water was 555 pounds and the total amount of isopropyl alcohol was 185 pounds. Assuming a variation of 50 to 500 per cent of these values, the range of proportions for the several components of the system may be tabulated as follows:

|  | Parts by weight |
|---|---|
| By-product oil as soaps | 100 |
| Water | 138.8 to 1388 |
| Isopropyl alcohol | 46.2 to 462 |

The solution, like that disclosed in Example I, is particularly well adapted to countercurrent extraction because it does not emulsify in such operation. The conditions of operation were as follows:

Column temperature, 106 to 125° F.
Soap solution feed, 135 parts by volume
Naphtha feed, 405 parts by volume The resultant naphtha concentrate of unsaponifiable matter was then further washed in a second column with water in order to remove any residual soaps remaining in solution in the naphtha. The second column was operated at a temperature of 96 to 148° F.

In this manner 12.9 pounds or 6.45 per cent of unsaponifiable matter based upon the extract treated was recovered upon evaporation of the solvent. This unsaponifiable matter represented 93.4 per cent of the tocopherol and 98.4 per cent of the total sterol content of the concentrate which was subjected to saponification.

In making up the soap solutions for extraction of the unsaponifiable matter in Examples I and II, wide variations in the ratios of the water and alcohol components to the saponified concentrate are contemplated. The total of one or both of these components may be 50% or even less than given in the examples. On the other hand, the ratio of either or both of these components may be increased four or five fold or even more.

The alkali employed in saponifications may be nearly molar with respect to the total of the fatty acids present as free acids or combined as triglycerides of the acids but the ratio is susceptible of considerable variation. For example, the ratio may be as much as 100% greater than molar. Usually, undue excesses are uneconomical.

As a preliminary of the saponification and extraction of the soybean oil concentrate of unsaponifiable matter as obtained from furfural or other polar solvent extraction of soybean oil, the concentrate may be subjected to treatment in order to facilitate the elimination of coloring matter in the unsaponifiable matter. In this operation the by-product or extract, before it is saponified, is treated with 22 pounds of commercial sulfuric acid dissolved in 22 pounds of water per each 200 pounds of oil. The mixture is thoroughly agitated for several hours at a temperature of approximately 170° F. The sulfuric acid may then be allowed to separate and is drawn off and the resultant treated oil or by-product oil is washed with water or, if preferred, the sulfuric acid may be left in the oil and neutralized with alkali, such as sodium hydroxide. When the by-product oil is thus treated with sulfuric acid and subjected to saponification and extraction in accordance with the provisions of the present invention, it is found that certain objectionable coloring matter initially present in the by-product is retained preferentially in the soap solution and is not extracted out into the naphtha concentrate of unsaponifiable matter.

It will be appreciated that in the foregoing examples and in similar applications of the principles of the invention, sodium hydroxide, potassium hydroxide, or ammonia or amines may be employed in the performance of the saponification operation. Methyl alcohol or isopropyl alcohol may be replaced by other of the lower alcohols such as ethyl, or n-propyl alcohol. Naphtha may be replaced by an ether such as diethyl ether or other ethers or by aromatic hydrocarbons such as toluene or xylene or by halogenated hydrocarbons such as ethylene dichloride or indeed by any other liquid organic solvents which are substantially immiscible with the alcohol and water solution of soaps and unsaponifiable matter.

In the extraction of the soap solution in order to remove the unsaponifiable matter, the ratio of solvent to soap solution is susceptible of wide variation though it is preferable that the solvent should at least equal the volume of the soap solution. However, any ratio of solvent to soap solution above this value can be employed. Of course, excessive increase of the volume of solvent becomes uneconomical because of the amount of solvent required to be evaporated and because of the size of the apparatus in proportion to the amount of material treated. Probably it will seldom be desired to employ a higher ratio solvent for unsaponifiable matter than 10 parts by volume to 1 part by volume of soap solution.

*Example III*

In accordance with the provisions of this example, a concentrate rich in tocopherol, sterols and other unsaponifiable matter of soybean oil was obtained from a by-product fraction of soybean oil resulting from extraction of soybean oil with a polar solvent as disclosed in Freeman Patents 2,200,390, 2,200,391 or 2,539,661, or Freeman applications Serial No. 62,089, filed November 26, 1951, now Patent 2,573,910, Serial No. 34,453, filed June 22, 1948, now Patent 2,573,898, Serial No. 608,119, filed August 1, 1945, now Patent 2,573,896, and subsequent extraction of the major portion of the fatty acid glycerides from the polar solvent phase with naphtha. The by-product portion rich in fatty acids, tocopherol, sterols and other unsaponifiable matter is retained in the polar solvent phase, and was recovered by distillation of the polar solvent.

In accordance with this example, 100 pounds of such soybean by-product of an acid value of 32, and iodine value of 137.9, a 2.51% tocopherol and 7.89% unsaponifiable matter, was treated with caustic soda in such manner as to minimize destruction of tocopherol. A satisfactory procedure involved addition of 20 pounds of sodium hydroxide, 69 pounds of water, and 125 pounds of 100% isopropanol to the foregoing quantity of by-product. Preferably the mixture of sodium hydroxide, water and isopropyl alcohol were refluxed together prior to the addition of the by-product, in order to eliminate dissolved oxygen which might adversely effect the tocopherol content of the by-product. Manifestly, if tocopherol is not to be recovered along with the other unsaponifiable matter, the refluxing procedure may be eliminated. The mixture was cooled to about 50° C. while nitrogen gas was bubbled through it, at which point the by-product was added and the mixture was refluxed while being protected with nitrogen, until saponification was complete or substantially complete. To this saponified mixture, 186 pounds of oxygen free water was added to provide a feed solution for the column I. Care was observed at all stages to avoid admission of oxygen to the solution. This can be attained by maintenance of a blanket of nitrogen gas over all free surfaces of the solution at all stages.

The feed solution as obtained, was of the following composition:

| | Per cent by weight |
|---|---|
| By-product (as soaps) | 20 |
| Isopropyl alcohol | 25 |
| Sodium hydroxide (free and combined) | 4 |
| Water | 51 |

Such mixture contained 0.50% tocopherol and 1.58% of unsaponifiable matter. The specific gravity of the mixture was 0.974.

The solution of soaps and unsaponifiable matter was fed in at 3 into the upper portion of the extraction zone in column I, which in this instance was a stainless steel tube of 2 inches diameter with an inlet for solvent of unsaponifiable matter spaced 59 feet below the inlet for the soap solution. There was a 20 foot clearing section at the top of the column and a 5 foot clearing section at the bottom. The column was operated at a temperature range of 130° F. to 140° F.

In a first run, column I was fed at 3 with 50 cc. per minute of soap solution and at 4 with a naphtha without any alcohol, at a rate of 150 cc. per minute. With naphtha alone as solvent medium for the unsaponifiable matter, difficulty of operation was experienced at these rates, owing to some emulsification of the phases with each other in their passage through the column.

In a second run, the substitution for the naphtha alone, of a naphtha feed, containing 4.76% by volume of isopropanol upon the basis of the mixture of solvents, eliminated the difficulty from emulsification and ready separation of phases was attained.

Runs were made to ascertain the maximum rate of feed in the above described column and under the conditions of operation previously described. The feed of soap solution in the last preceding example was increased in stages first to 60, then 70, then 80, then 90, and finally to 100 cc. per minute, the feeds of naphtha and isopropanol being increased proportionally. No difficulty with column flooding was experienced at any of these rates. These constitute excellent rates of feed.

The naphtha solutions of unsaponifiable matter from column I were washed with water in column II which was of iron and of similar diameter to column I. The temperature of washing ranged from 105° F. to 110° F. The spacing of the inlets for wash water and naphtha solution of unsaponifiable matter in column II was 47¼ feet. Clearing sections respectively of 1¾ feet and 2 feet were maintained at the top and bottom of the column II. The wash water feed was in a ratio of 1 to 1 with respect to the original water-alcohol-soap feed to column I.

The recovery of available tocopherol based on the content of the original by-product was 80%. The recovery of unsaponifiable matter was 99% upon the same basis. (Percentages as herein given are by weight.)

Recovery of a fraction of increased tocopherol content from the recovered unsaponifiable matter may be effected in various ways. For example, the unsaponifiable fraction from column II may be subjected to distillation to eliminate the naphtha. The mixture of tocopherol and other unsaponifiable matter may then be subjected to vacuum distillation preferably accompanied by hydrogenation in order to obtain a fraction of high tocopherol content. The sterols may be removed from the distillates by crystallization from solvents.

On the other hand, the unsaponifiable material may be subjected to fractional crystallization from a medium such as a mixture of 68% by volume methanol and 32% by volume of isopropyl ether. The ratio of solvent to unsaponifiable material upon a weight basis may be 4 to 1. The rate of solution of the unsaponifiable matter may be promoted by refluxing the mixture. A sterol rich fraction may be crystallized off at a temperature of 10 to 15° C. The crystals so obtained are washed with solvent to remove the intense color (yellow-red) and the sterols remaining are of straw color. They may be subjected to any further processing which may be desired.

The solution of inhibitols comprising tocopherol remaining is of intense red color. It can be processed further by distillation or hydrogenation if so desired.

*Example IV*

In this example, the starting material was again a by-product recovered from the furfural after extraction of the major portion of the glycerides from the furfural with naphtha in solvent fractionating soybean oil. This by-product contained 7.02% by weight unsaponifiable matter, including 1.96% by weight upon the basis of the by-product of tocopherol. The acid value was 48.9 and the iodine value was 148.4.

This material was made up into a soap solution in water and isopropyl alcohol as in Example III and then was countercurrently extracted with naphtha of an average molecular carbon content of about 7 atoms per molecule. Column I in this example was of stainless steel packed with ½ inch Berl saddles. It was of the following dimensions:

Diameter _____ 6 inches.
Height _____ 88.75 feet.
Upper clearing zone___ 3.75 feet (unpacked) plus 31.75 feet packed.
Lower clearing zone___ 6 feet (unpacked).

The temperature ranges corresponded to those disclosed in Example III.

The feed rate was:
Soap solution 150 milliliters per minute. The naphtha feed was varied from 150 to 600 milliliters per minute, the average being about 300 milliliters per minute. The isopropyl content of the naphtha employed for extraction varied from 2.44% to 4.76% by volume.

The naphtha extract solution was washed in column II which was packed in the extraction zone with ½ inch Berl saddles and which was of the following dimensions:

Diameter _____ 3 inches.
Height _____ 87 feet, 6 inches.
Upper clearing zone___ 22 feet, 10 inches (packed).
Lower clearing zone___ 6 feet, 6 inches (unpacked).

A total of 1780 pounds of by-product were so processed. A yield of 122 pounds of unsaponifiable matter, representing a percentage yield of 97% of the available unsaponifiable matter, was recovered. This contained 38.7 pounds or 31.7% of tocopherol.

About 25 pounds of the unsaponifiable matter was crystallized at 20° C. from a mixture of 70% by weight methanol, 30% by weight isopropyl ether. The crystals were washed with additional solvent. A yield of 29.5% based upon the unsaponifiables of sterols having a melting point of 137.3–138.2° C. was obtained.

The inhibitol fraction was retained in the solvent. The inhibitol constituted 4.83% on the basis of the original by-product. The tocopherol content was 1.93% on a like basis.

The following additional examples illustrate the application of the techniques of the present invention to the recovery of unsaponifiable matter, and notably of sterols, from the soap stocks from soya oil. It is preferred to split off the fatty acids combined with glycerides as free fatty acids and then to distill off a considerable proportion of such acids as an intermediate step. In some cases, the stocks may contain considerable amounts of gum which may interfere with the splitting operations. This gum may be removed, in accordance with the provisions of the present invention by preliminarily treating the stock with 15% sulphuric acid and washing out water soluble materials with water.

In any event, the final fatty acid mixture containing the unsaponifiable matter, before distillation, will contain from approximately 3 to 10% of unsaponifiable matter, and 80 to 97% of free acids. Residual esters may also be present. The percentage of the latter may vary from 0 to 10%. The percentages, as above given, are to be considered as being by weight. The mixtures may be distilled under vacuum, and the temperature should not be permitted to go substantially above 250° C. In this manner, a distillate constituting 75 to 95% of the charge can be obtained. Small amounts of unsaponifiable matter may also be present in the distillate. The amount will usually be within the range of 0.5 to 2% by weight. Normally, but little of the sterols will be carried over into the distillate.

The pot residue is a dark viscous liquid or even a semi-solid or waxy material. The pot residue will contain, in most instances, about 5 to 50% unsaponifiable matter including nearly all of the sterols and from 5 to 60% volatile fatty acids and polymerized fatty acids, and any glycerol esters resulting from incomplete splitting, and any wax-type esters from the sterols and other alcohols in the unsaponifiable matter. Soya acid distillation pitches generally will contain at least 20% unsaponifiable matter, of which about 50% comprises the sterols, which are rich in stigmasterol.

The sterols from the distillation residues cannot be recovered by direct methods, such as crystallization, probably because most of the sterols are tied up in the mixture in the form of esters. The saponification operations herein disclosed result in splitting of these esters and the subsequent steps of solvent extraction of the unsaponifiable matter eliminate the fatty acids as soaps from the system so that the sterols can then be separated off in relatively pure state by crystallization, or by distillation under high vacuum, or by other methods.

It is to be understood that approximately a seven-fold increase in the concentration of the sterols is secured by distillation. The pot residue or still residue will contain from 4 to 8 times as much sterol as the whole fatty acid feed stock which is subjected originally to distillation.

It must be recognized that distillation conditions may influence yield and properties of the sterols in the distillation residue. Temperatures that are too high, or too long an exposure to more moderate temperatures may cause destruction or deterioration of the sterols. Distillation should be conducted under vacuum and at a relatively low temperature, and at as high vacuum as is practicable to attain, is preferred.

An appropriate solution system obtained from a distillation pitch from a soya soap stock acids comprises a mixture of distillation pitch in the form of soaps and unsaponifiable matter, 20% by weight; isopropanol, 25% by weight; sodium hydroxide, partially in the form of soaps, 4% by weight; and the rest (51% by weight) water.

In the saponification of the glycerides and the free fatty acids of a soap stock, a by-product from solvent fractionation, or similar source material containing relatively large amounts of unsaponifiable matter, alkali such as sodium hydroxide or potassium hydroxide preferably, is employed in sufficient excess to insure complete saponification. Usually the excess proportion will not be greater than 100% upon a molar basis.

The following examples illustrate the application of the invention to the separation of unsaponifiable matter from a soap stock obtained in the refining of soya oil with alkali.

Example V

A soap stock obtained in the alkali treatment of soya oil was further treated by boiling with excess alkali to saponify the glycerides and other esters present in the original stock. This material is allowed to settle and a two phase system formed, the upper soap solution being then separated from the lower layer containing the solution of excess alkali, water and glycerol. The upper soap solution was analyzed by method G3-39 of the American Oil Chemists Society and was found to contain 52.8% fatty acid. The remainder consisted of water and water soluble constituents. The fatty acids were found to contain 4.9% unsaponifiable matter. This soap stock in an amount of 2,000 grams was made up into solution with 4,000 grams of water and 2,660 grams of isopropyl alcohol. The solution was fed in a continuous stream into the top of a 1 inch laboratory column, 6 feet long, appropriately packed with ¼ inch Berl saddles. The clearing zones were approximately 0.5 foot top and 0.5 foot bottom. The feed rate was 7.5 cc. of soap solution per minute. A naphtha, which in this instance was paraffinic and of an average carbon content of approximately 7 carbon atoms per molecule, was fed in at the bottom of the column at a rate of 15 cc. per minute. The temperature of the column was 130° F. In a single pass through the column, 45.6 grams of unsaponifiable matter was separated and recovered by evaporation of the naphtha. This constituted a yield of 87.9% of the unsaponifiable matter present in the original sample. In order to separate sterols rich in stigmasterol from this unsaponifiable matter, the latter material was dissolved in acetone in a proportion of 10 parts by weight of acetone per part by weight of the unsaponifiable matter. Upon cooling the solution, the sterols separated out and were filtered. The sterols were obtained as a crystalline product having a melting point of 130 to 132° C. with a yield of 17.0 grams.

A distillation pitch as obtained by distilling a mixture of soybean acids and soybean unsaponifiable matter from a soap stock as obtained in the refining of soya oil may be substituted for the undistilled material as described in the foregoing example. Such pitch contains approximately 20% to 30% by weight of unsaponifiable matter. Sterols having a melting point of 127° C. can readily be crystallized out in a yield of 40% upon the basis of the unsaponifiable matter.

Example VI

In this example, a distillation pitch from a commercial soap stock obtained in the refining of soybean oil was employed as a starting material. This pitch contained 20.5 per cent by weight of unsaponifiable matter. The remainder of the pitch was primarily fatty acids of soybean oil. For purposes of saponification, a batch was made up as follows:

100 parts by weight of pitch
15.0 parts by weight of alkali
55.5 parts by weight of isopropanol
52.5 parts by weight of water This batch was refluxed for 8 hours in order to attain relatively complete saponification. The resultant mixture was then diluted so that the solution to be extracted with solvent of unsaponifiable matter had the following composition:

| | Per cent by weight |
|---|---|
| Pitch (as soaps) | 19.1 |
| Sodium hydroxide | 2.9 |
| Isopropanol | 25.6 |
| Water | 52.4 |

The resultant solution was subjected to countercurrent extraction with naphtha of approximately heptane grade.

*Run 1.*—In this run, an iron column of 2 inches diameter packed with ½ inch Berl saddles was employed as column I. The column was 51 feet tall, there being a 1.75 foot clearing zone $a$ at the top and a 2 foot clearing zone $b$ at the bottom. The wash column II was also 51 feet tall and was constructed of iron. The upper clearing zone was 1.75 feet (unpacked) and the lower clearing zone was 7 feet, of which 5 feet were packed.

Soap solution was fed into the top of the column at a rate of 40 milliliters per minute and naphtha containing 4.76 per cent by volume of isopropanol was fed in at the bottom at the rate of 60 milliliters per minute. The temperature of the column was 145° F. at the top and 135° F. at the bottom.

The naphtha extract solution from the column I was fed into the column II at a rate of 70 milliliters per minute and was washed with an equal volume of a mixture of 80 per cent water and 20 per cent isopropanol. (Percentages are by volume.) The temperature of the column was 135° F. at the bottom and 143.5° F. at the top.

*Run 2.*—In this run, a stainless steel column of 6 inches diameter was employed for purposes of counter-current extraction of the soap solution with naphtha. The column was packed with ½ inch Berl saddles, was 88 feet, 9 inches tall with a space of 79 feet between the inlet for soap solution and the inlet for naphtha solution. A 3 foot, 9 inch unpacked clearing zone was left at the top and a 6 foot unpacked lower clearing zone was left at the bottom of the column. The soap solution was fed at 3 to the column at a rate of 300 milliliters per minute while naphtha of an average of 7 carbon atoms per molecule was fed in at 4 at a rate of 600 milliliters per minute. The operating temperature was 140° F. at the top and 145° F. at the bottom.

The naphtha extract solution containing a concentrate of unsaponifiable matter of the pitch, was washed in a stainless steel column of 3 inches diameter, 65 feet high packed with ½ inch Berl saddles. The inlet for naphtha solution was 6 feet, 6 inches above the bottom and the inlet for washing fluid was 55 feet from the bottom. The top clearing zone was packed. The bottom clearing zone was unpacked. Wash water was fed in at a rate of 250 milliliters per minute. The naphtha extract solution was fed into the 3 inch column as it was taken off from the 6 inch column. The 3 inch column was operated at a temperature of 125° F. bottom and 130° F. bottom.

In both of these runs, at least 95% of the unsaponifiable matter in the soap solution was extracted. The unsaponifiable matter obtained by evaporation of solvent was a brownish solid.

For purposes of purification of sterols, the unsaponifiable matter was dissolved in a proportion of 1 part by weight in 10 parts by weight of a mixture comprising 30 per cent by weight of isopropyl ether and 70 per cent by weight of methanol. In order to obtain solution of the solids, the solvent was refluxed and the resultant mixture was filtered while hot to remove any suspended matter contained therein. The solution was cooled to 20° C. and the crop of crystals which came down was filtered off, washed and dried. The product had a somewhat brownish color but the melting point was within the range of 134 to 135° C. The yield was 49.7 per cent of the unsaponifiable matter, or 10.3 per cent based upon the original pitch. The color of the crystals could be improved by recrystallization and/or treatment of the solution thereof with activated carbon. In many instances, such decolorization treatment apparently would not be required.

The extracted soap solution obtained in the foregoing treatment was acidified and the free fatty acid layer was water washed and dried. The fatty acids were then distilled under vacuum to yield 58.7 per cent by weight of distilled acids of an iodine value of 95.1, acid value of 193.7. The product was a semi-solid at room temperature.

*Example VII*

Substitute methyl alcohol for isopropyl alcohol in any one of the preceding examples and proceed as outlined in the example.

*Example VIII*

Substitute ethyl alcohol for isopropyl alcohol in any of Examples I through VI and proceed as outlined in the selected example.

*Example IX*

Substitute propyl alcohol for isopropyl alcohol in any one of Examples I through VI and proceed as outlined in that example.

The forms of the invention herein described are to be regarded merely as by way of example. It will be apparent to those skilled in the art that numerous modifications may be made therein without departure from the spirit of the invention or the scope of the appended claims.

This application is a continuation-in-part of my copending applications Serial Numbers 160,919 filed May 9, 1950, now Patent 2,573,891, and 162,269 filed May 16, 1950, now abandoned.

I claim:

1. A process of obtaining a concentrate of the unsaponifiable matter of soybean oil from a mixture of fatty glycerides of soybean oil containing from 4 to 30% of unsaponifiable matter of soybean oil and 5 to 40% of free fatty acids of soybean oil, which process comprises saponifying the glycerides and the free fatty acids in said mixture with an alkali, making up the resultant mixture containing soaps of free fatty acids and unsaponifiable matter into solution with water and isopropyl alcohol, the water being present in a proportion of 277.5 to 2775 parts, and the isopropyl alcohol being present in a proportion of 92.5 to 925 parts for each 200 parts of the mixture, then removing the unsaponifiable matter from the mixture by introducing the solution into the upper portion of an extraction zone while introducing naphtha, in a proportion of 1 to 10 parts per part of solution, into the lower portion of the same zone, drawing off the naphtha solution of unsaponifiable matter at the top of the zone, and evaporating the naphtha to obtain said fraction of unsaponifiable matter.

2. A process of obtaining a concentrate of unsaponifiable matter, comprising sterols and inhibitols, from a mixture thereof resulting from the solvent extraction of soybean oil with furfural to obtain a solution of highly unsaturated glycerides, sterols, inhibitols, and free fatty acids in furfural, extracting out most of the glycerides from the solution with naphtha, and evaporating the furfural in the residual solution, which process comprises the steps of saponifying the residual glycerides and free fatty acids from the furfural solution with sodium hydroxide making up the soaps and unsaponifiable matter as a solution in water and isopropyl alcohol, the isopropyl alcohol being employed in a proportion of 185 pounds for each 200 pounds of the concentrate prior to saponification, the solution being diluted with 555 pounds of water, the unsaponifiable matter being extracted out of the solution counter-currently by introducing the solution into the upper portion of an extraction zone and introducing naphtha into the lower portion of the same zone, allowing the solution and naphtha to flow counter-currently with respect to each other, recovering the naphtha solution of unsaponifiable matter at the top of the extraction zone, and evaporating the naphtha.

3. A process of obtaining a concentrate of the unsaponifiable matter of soybean oil from a mixture of fatty glycerides, unsaponifiable matter and free fatty acids of soybean oil obtained as a by-product by extracting soybean oil with furfural and washing the furfural solution, rich in unsaturated glycerides and unsaponifiable matter, with naphtha to remove glycerides, then recovering said by-product from the furfural, which process comprises saponifying the free fatty acids and the glycerides of the by-product with sodium hydroxide, and making up the resultant mixture of soaps of fatty acids of soybean oil and unsaponifiable matter of soybean oil into solution in a mixture of water and an alcohol of a class consisting of isopropyl alcohol and methyl alcohol; for isopropyl alcohol, for each 100 parts by weight upon a water free basis of the by-product subjected to saponification, 46.2 to 462 parts by weight of isopropyl alcohol and 138.8 to 1388 parts by weight of water; for methyl alcohol, for each 100 parts of by-product, the proportions of methyl alcohol being 81.9 to 819 parts, and water 153.0 to 1530.0 parts; and the alcohol solution then being extracted with naphtha in a proportion of 1 to 10 parts per part of solution extracted, then separating the naphtha solution of unsaponifiable matter from the water and alcohol solution of soaps, and evaporating the naphtha to recover the unsaponifiable matter contained therein.

4. A process as defined in claim 3 in which the alcohol is methyl alcohol.

5. A process of obtaining a concentrate of unsaponifiable matter of soybean oil, which process comprises contacting soybean oil containing unsaponifiable matter and free fatty acids, with furfural to extract out a fraction of said oil rich in more highly unsaturated glycerides, free fatty acids and unsaponifiable matter, and contacting the resultant solution with naphtha selectively to extract out the major portion of the glycerides from the furfural, evaporating the furfural from the remaining solution of by-product, then saponifying the free fatty acids and the glycerides from the by-product, with sodium hydroxide, making up the resultant mixture comprising soaps of fatty acids of soybean oil and unsaponifiable matter of soybean oil into solution in a mixture of water and an alcohol of a class consisting of isopropyl alcohol and methyl alcohol; the solution for isopropyl alcohol comprising, for each 100 parts by weight upon a water free basis of the by-product subjected to saponification, 46.2 to 462 parts by weight of isopropyl alcohol and 138.8 to 1388 parts by weight of water; the solution for methyl alcohol comprising, for each 100 parts by weight of the by-product saponified, 81.9 to 819 parts by weight of methyl alcohol and 153 to 1530 parts by weight of water, the saponified mixture in the water and the alcohol then being extracted with naphtha in a proportion of 1 to 10 parts per part of solution extracted, then separating the naphtha solution of unsaponifiable matter from the water and alcohol solution of soaps, and evaporating the naphtha to recover the unsaponifiable matter contained therein.

6. A process of obtaining a concentrate of unsaponifiable matter of soybean oil, which process comprises the steps of contacting soybean oil containing said unsaponifiable matter, glycerides of fatty acids of varying degrees of saturation and unsaturation and free fatty acids, with furfural to extract out a fraction of said oil rich in more highly unsaturated glycerides, free fatty acids and unsaponifiable matter, contacting the resultant solution with naphtha selectively to dissolve out the major portion of the glycerides from the furfural, evaporating the furfural from the remaining solution of by-product, then saponifying the free fatty acids and the glycerides of the by-product with sodium hydroxide, making up a solution comprising 100 parts by weight upon a water free basis of the resultant mixture comprising soaps of fatty acids of soybean oil and unsaponifiable matter of soybean oil in 146 to 1460 parts by weight of water and 61 to 610 parts by weight of a monohydric alcohol containing 1 to 3 carbon atoms, then extracting the resultant solution with naphtha in a proportion of 1 to 10 parts by volume per part of solution, separating the naphtha solution of unsaponifiable matter from the solution of soaps in water and said alcohol, and evaporating the naphtha to recover the unsaponifiable matter contained therein.

7. A process as defined in claim 1 in which the solution of unsaponifiable matter in naphtha is washed with water prior to the evaporation of the naphtha.

8. A process of obtaining a concentrate of the unsaponifiable matter of soybean oil from a mixture of fatty glycerides of soybean oil containing from 3 to 50% of unsaponifiable matter of soybean oil, which process comprises saponifying the glycerides in said mixture with an alkali making up the resultant mixture containing soaps of free fatty acids and unsaponifiable matter into solution with water and a lower monohydric, saturated, alkyl alcohol containing 1 to 3 carbon atoms, the solution containing 100 parts by weight upon a water free basis of the mixture of unsaponifiable matter and soaps in 146 to 1,460 parts by weight of water and 61 to 610 parts by weight of said alcohol, continuously counter-currently extracting the resultant solution with naphtha in a proportion of 1 to 10 parts by volume per part of solution, separating the naphtha solution of unsaponifiable matter from the resultant soaps in water and said alcohol and evaporating the naphtha to recover the unsaponifiable matter contained therein.

9. A process of obtaining a concentrate of the unsaponifiable matter of soybean oil from a mixture of fatty glycerides of soybean oil containing from 3 to 50% of unsaponifiable matter of soybean oil which process comprises saponifying the glycerides of said mixture with an alkali, acidifying the resultant soaps to liberate free fatty acids, selectively distilling off free fatty acids from the unsaponifiable matter, subjecting the still residues to saponification with alkali in order to convert the free fatty acids therein into soaps, making up the resultant mixture of soaps and unsaponifiable matter into a solution comprising 100 parts by weight upon a water free basis of soaps and unsaponifiable matter in 146 to 1460 parts by weight of water and 61 to 610 parts by weight of a monohydric saturated alkyl alcohol containing 1 to 3 carbon atoms in the molecule, counter-currently extracting the resultant solution with naphtha in a proportion of 1 to 10 parts by volume, per part by volume of solution, separating the naphtha solution of unsaponifiable matter from the solution of soaps in water and said alcohol and evaporating the naphtha to recover the unsaponifiable matter contained therein.

10. A process of obtaining a concentrate of the unsaponifiable matter of soybean oil from a mixture comprising 3 to 50% by weight of said unsaponifiable matter in soaps of fatty acids of soybean oil, which process comprises making up a solution of 100 parts by weight of the resultant mixture of soaps and unsaponifiable matter in 146 to 1460 parts by weight of water, and 61 to 610 parts by weight of a monohydric saturated alkyl alcohol containing 1 to 3 carbon atoms, continuously counter-currently extracting the resultant solution with naphtha in a proportion of 1 to 10 parts by volume per part of solution, separating the naphtha solution of unsaponifiable matter from the solution of soaps in water and said alcohol, and evaporating the naphtha to recover the unsaponifiable matter contained therein.

11. A process of obtaining unsaponifiable matter of soybean oil from a soap stock resulting from the refining of soybean oil with alkali and separation of the resultant precipitates, which process comprises the steps of treating the soap stock with alkali to convert the glycerides therein to soaps, making up the resultant mixture of soaps and unsaponifiable matter into a solution comprising 100 parts by weight upon a water free basis of the mixture, 146 to 1460 parts by weight of water, and 61 to 610 parts by weight of a monohydric saturated alkyl alcohol containing 1 to 3 carbon atoms, continuously introducing the solution into one end of an extraction zone, continuously introducing a solvent of unsaponifiable matter in a ratio of 1 to 10 parts by volume per part of solution into the other end of the extraction zone, flowing the solutions counter-currently through each other, drawing off the solution of unsaponifiable matter in the solvent thereof at the end of the extraction zone opposite the end of introduction and evaporating the solvent to obtain said fraction of unsaponifiable matter.

12. A process of obtaining the unsaponifiable matter of soybean oil from soap stock resulting from the refining of soybean oil with alkali and separation of the resultant precipitate, which process comprises the steps of treating the stock with alkali in order to saponify the glycerides of said mixture, acidifying the resultant soaps to liberate the free fatty acids, distilling off the free fatty acids from the mixture of acids and unsaponifiable matter under vacuum, saponifying the free fatty acids in the still residue with alkali, making up the resultant mixture of soaps and unsaponifiable matter into a solution comprising 100 parts by weight upon a water free basis of the mixture of soaps and unsaponifiable matter in 146 to 1460 parts by weight of water and 61 to 610 parts by weight of monohydric, saturated alkyl alcohol containing 1 to 3 carbon atoms, continuously introducing the resultant solution into one extremity of an elongated extraction zone while continuously introducing solvent of unsaponifiable matter which is incompletely soluble in the solution at the other end of the extraction zone, flowing the solution and the solvent counter-currently through each other, removing the solution of solvent and unsaponifiable matter at the end of the extraction zone opposite to the end of introduction of solvent, and evaporating the solvent to recover the unsaponifiable matter contained therein.

13. A process of obtaining unsaponifiable matter of soybean oil which process comprises treating with alkali a concentrate of said unsaponifiable matter in a material comprising said unsaponifiable matter dissolved in a proportion of 3 to 50% in glycerides of soybean oil and a material of a class consisting of free fatty acids of soybean oil and soaps of said acids whereby to convert the glycerides and free fatty acids into soaps making up the mixture of soaps and unsaponifiable matter in a proportion of 100 parts by weight upon a water free basis into solution in water in a proportion of 146 to 1460 parts by weight and a lower monohydric saturated alkyl alcohol containing 1 to 3 carbon atoms in a proportion of 61 to 610 parts by weight, feeding the resultant solution continuously into one end of an elongated extraction zone, feeding into the same zone at the opposite end thereof, a solvent of unsaponifiable matter insoluble in the solution in a proportion of 1 to 10 parts by volume per part by volume of the solution, drawing off the solution of unsaponifiable matter in said solvent at the end of the extraction zone opposite the end of introduction of the solvent, and evaporating the solvent to recover the unsaponifiable matter contained therein.

14. In a process of obtaining unsaponifiable matter of soybean oil in high concentration, the steps which comprise saponifying the glycerides of soybean oil in a mixture containing unsaponifiable matter of soybean oil in a proportion of 3 to 50% in said glycerides and a material of a class consisting of free fatty acids of soybean oil and soaps of said acids, treating the resultant mixture of soaps and unsaponifiable matter with acid to liberate the free fatty acids and to form soluble salts of alkali, washing out the soluble salts with a solvent thereof insoluble in the fatty acids and unsaponifiable matter, distilling off a substantial amount of the free fatty acids under vacuum to obtain a still residue rich in unsaponifiable matter, resaponifying the fatty acids remaining in the still residue with alkali, making up the resultant mixture of soaps of fatty acids and unsaponifiable matter into a solution comprising 100 parts by weight upon a water free basis of said mixture, 146 to 1460 parts by weight of water, and 61 to 610 parts by weight of a monohydric, saturated alkyl alcohol containing 1 to 3 carbon atoms, feeding the resultant solution into an elongated extraction zone at one end thereof, feeding into the same zone at the opposite end thereof a selective solvent of unsaponifiable matter in a proportion of 1 to 10 parts by volume per part by volume of solution, separating the resultant solution of unsaponifiable matter in said solvent thereof, at the end of the extraction zone opposite the end of introduction of the solvent of unsaponifiable matter and evaporating the solvent of unsaponifiable matter from the latter solution.

15. The process as defined in claim 14 in which sterols in said unsaponifiable matter are then separated from the remainder of the unsaponifiable matter.

16. The process as defined in claim 14 in which the sterols are crystallized out from the remainder of the unsaponifiable matter.

17. In a process of obtaining the sterols of soybean oil from a mixture of acids of soybean oil, soybean oil unsaponifiable matter and esters of sterols and fatty acids, the steps of saponifying said acids and breaking the ester linkages with alkali, extracting out the free sterols and the unsaponifiable matter from a remainder of the unsaponifiable matter, said unsaponifiable solution of soaps of said acids, said unsaponifiable matter and said sterols in water and a lower monohydric saturated alkyl alcohol of from 1 to 3 carbon atoms by means of a solvent of unsaponifiable matter which is incompletely soluble in the solution and separating the sterols from the remainder of the unsaponifiable matter.

18. In a process of obtaining unsaponifiable matter of soybean oil in high concentration from a mixture of soaps of soybean acids and said unsaponifiable matter obtained by saponification with alkali, a material containing 3 to 50% by weight of said unsaponifiable matter in a mixture of glycerides of soybean oil and a material of a class consisting of soybean fatty acids and soaps of said acids, said first mentioned mixture being dissolved in a solvent solution containing, for each 100 parts by weight upon a water free basis of said first mentioned mixture, 146 to 1460 parts by weight of water, and 61 to 610 parts by weight of a monohydric alkyl alcohol containing 1 to 3 carbon atoms per molecule; the steps of feeding the solution into an elongated extraction zone at one end thereof, feeding into the same zone at the opposite end thereof, a selective solvent of unsaponifiable matter in a proportion of 1 to 10 parts by volume per part by volume of solution of said first mentioned mixture, removing the resultant solution of unsaponifiable matter in said solvent thereof at the end of the extraction zone opposite the end of introduction of said solvent and evaporating said solvent from the latter solution to obtain said unsaponifiable matter.

19. The steps as defined in claim 18 in which the solvent of unsaponifiable matter is naphtha.

20. The process of claim 10, in which the naphtha employed in continuously counter-currently extracting the solution of soaps and unsaponifiable matter in water and monohydric alcohol, contains added monohydric alcohol in an amount to inhibit emulsification difficulties.

References Cited in the file of this patent

UNITED STATES PATENTS

| Number | Name | Date |
|---|---|---|
| 2,173,629 | Milas | Sept. 19, 1939 |